United States Patent [19]

San Andres

[11] Patent Number: 5,433,528
[45] Date of Patent: Jul. 18, 1995

[54] TWO PAD AXIALLY GROOVED HYDROSTATIC BEARING

[75] Inventor: Luis A. San Andres, College Station, Tex.

[73] Assignee: Rockwell International Corporation, Seal Beach, Calif.

[21] Appl. No.: 203,233

[22] Filed: Feb. 28, 1994

[51] Int. Cl.⁶ .............................................. F16C 32/06
[52] U.S. Cl. .................................. 384/100; 384/118
[58] Field of Search ...................... 384/100, 114, 118

[56]  References Cited

U.S. PATENT DOCUMENTS

| | | | |
|---|---|---|---|
| 2,692,803 | 10/1954 | Gerard | 384/118 |
| 3,395,952 | 8/1968 | Deffrenne | 384/118 |
| 4,671,676 | 6/1987 | Chen et al. | 384/100 |

FOREIGN PATENT DOCUMENTS

| | | | |
|---|---|---|---|
| 2351494 | 4/1975 | Germany . | |
| 1010648 | 11/1965 | United Kingdom | 384/114 |

Primary Examiner—Thomas R. Hannon
Attorney, Agent, or Firm—H. Frederick Hamann; Harry B. Field; Steven E. Kahm

[57]  ABSTRACT

A hydrostatic bearing having two axial grooves on opposite sides of the bearing for breaking the rotational symmetry in the dynamic force coefficients thus reducing the whirl frequency ratio and increasing the damping and stiffness of the hydrostatic bearing.

5 Claims, 1 Drawing Sheet

TWO PAD AXIALLY GROOVED HYDROSTATIC BEARING

STATEMENT OF GOVERNMENT INTEREST

This invention was made with Government support under NAGW-1194 awarded by NASA. The Government has certain rights in the invention.

BACKGROUND OF THE INVENTION

1. Field of the Invention

This invention relates to hydrostatic bearings and more particularly to hydrostatic bearings having two pads with axial grooves to improve dynamic stability.

2. Description of Related Art

Hydrostatic bearings have been in use for many years. One of the problems encountered with hydrostatic bearings are their stability characteristics. Hydrostatic bearings journals tend to whirl which is an undesirable feature. One of the factors which limits the speed at which a hydrostatic bearing can operate is the whirl frequency ratio, therefore reducing the whirl frequency ratio is a long sought desired end. As the whirl frequency ratio increases the damping capability of the hydrostatic bearing decreases. Many techniques have been introduced to reduce the whirl frequency ratio, among them are roughened bearing surface walls, non-rectangular recess geometries, liquid injection opposite to shaft rotation, increased recess edge downstream losses, and discharge wear rings or end seals. However these techniques all try to reduce the development of circumferencial flow velocity which yields the undesired cross-coupled stiffness coefficients.

SUMMARY OF THE INVENTION

A hydrostatic bearing having 2 axial grooves located 180° apart effectively dividing the hydrostatic bearing into two cylindrical pads. The grooves are deep volume regions connected to the region of pressure discharge and effectively breaks the rotational symmetry of the bearing. This introduces an asymmetry in the dynamic force coefficients which brings a reduced value to the whirl frequency ratio and thus increases the speed at which the journal can operate.

OBJECTS OF THE INVENTION

To increase the speed at which a hydrostatic bearing can be operated.

To reduce the whirl frequency ratio of a hydrostatic bearing.

To increase the stiffness of a hydrostatic bearing.

To improve the dynamic characteristics of a hydrostatic bearing.

To improve the stability characteristics of a hydrostatic bearing.

To promote simplicity in the design and manufacture of a hydrostatic bearing.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
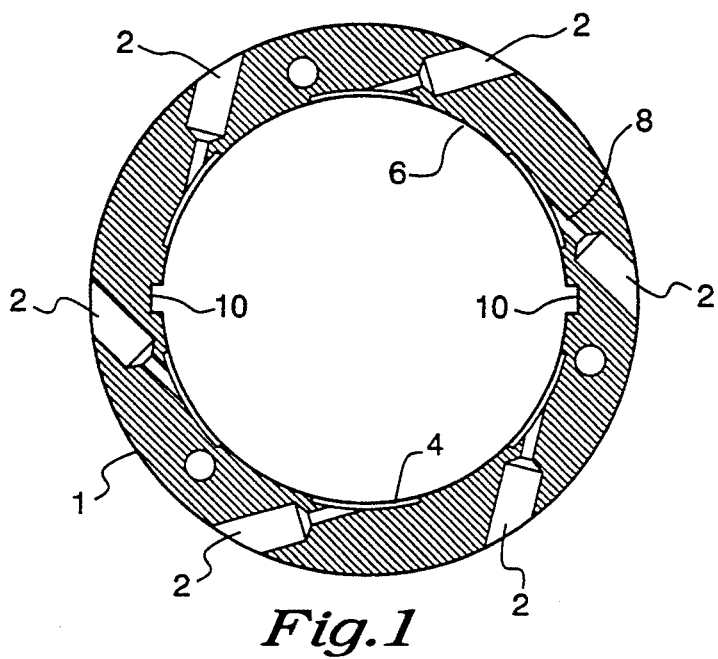
FIG. 1 is a cross section of the hydrostatic bearing.
Figure 2:
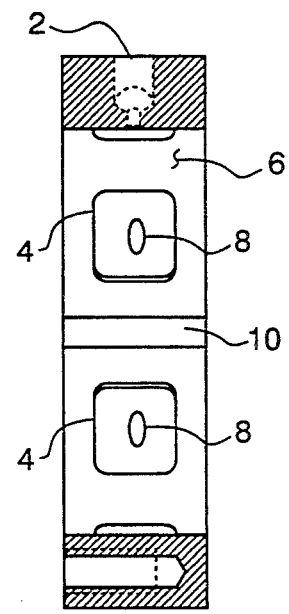
FIG. 2 is an inside surface view of the hydrostatic bearing.
Figure 3:
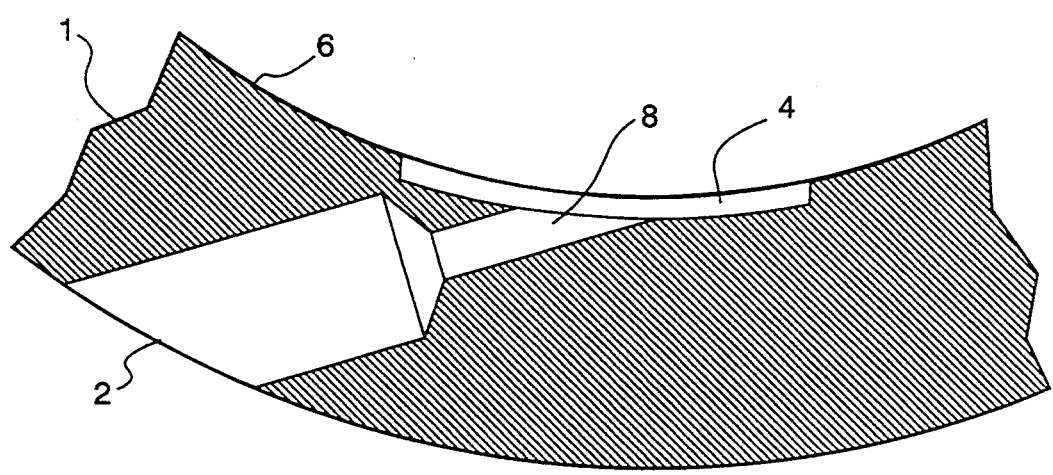
FIG. 3 is a blown up portion of the cross section shown at B of FIG. 1.

FIG. 1 shows a cross section of the two pad hydrostatic bearing 1, which has fluid injection ports 2, leading to a recessed portion 4, of the hydrostatic bearing's inside surface 6. Tile fluid is introduced to the hydrostatic bearing at high pressure through orifices 8, evenly around the hydrostatic bearing 1, to the recessed portion 4, which is adjacent to a journal, not shown. As understood by those skilled in the art the clearance between the journal and the inside surface 6 of the hydrostatic bearing is very small to maintain the high pressure and stiffness which the fluid must exert on the journal. Due to very complex fluid flow dynamics the spinning shaft introduces flows to the fluid which increase pressures on some portions of the area between the journal and the hydrostatic bearing inside surface and decrease pressures in other areas. These pressures induce forces which cause the journal to whirl, and there is a resulting loss of effective damping in the hydrostatic bearing. These forces are deleterious to the performance of the hydrostatic bearing and should be reduced or eliminated for high performance hydrostatic bearings.

The applicant has added two axial grooves 10, located 180° apart and effectively dividing the original circular bearing into two cylindrical pads. The grooves are deep volume regions connected to the region of pressure discharge and effectively break the rotational symmetry of the bearing. This asymmetry brings to the bearing centered position an asymmetry in the dynamic force coefficients which brings a reduced value in the whirl frequency ratio, and thus improves the performance of the hydrostatic bearing.

The location of the bearing recesses adjacent to the axial grooves is critical for the invention to work successfully and accomplish its technical goals. If the recesses are located too close to the grooves, the bearing flow rate will increase dramatically and the bearing will have poor static performance characteristics. On the other hand, if the bearing recesses are located too far from the grooves, the bearing will possess a very low stiffness along an imaginary line joining the two axial grooves. This is also an undesirable effect for dynamic performance.

The design shown in the FIGURES has a diameter of 92.71 mm, an axial length of 37.08 mm, a clearance of 0.0762 nm, a recess depth of 0.228 mm, an axial recess length of 19 mm, a circumference length of 19 mm, and the inside surface of the hydrostatic bearing is smooth. The grooves are 12.12 mm wide and at least 10 times as deep as the radial clearance.

The drawings show a two pad hydrostatic bearing and with 3 recessed portions in each of the two pads. However it should be understood that other embodiments with different numbers of recessed portions per pad can be used.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A hydrostatic bearing comprising:

a cylindrical inside surface
a fluid injection portion having an orifice on the inside surface for injecting a fluid under pressure to the hydrostatic bearing;
at least one axial groove on the cylindrical inside surface extending to a pressure discharge region to introduce asymmetries in the fluid flow and thereby improve the performance of the bearing.

2. A hydrostatic bearing as in claim 1 wherein, there is a recess portion on the circular inside surface surrounding the fluid injection portion orifice.

3. A hydrostatic bearing as in claim 1 wherein, there are two axial grooves 180° apart.

4. A hydrostatic bearing as in claim 3 wherein, there are three fluid injection orifices between each of the axial grooves, each 60° apart.

5. A hydrostatic bearing as in claim 3 wherein, there is a recess portion on the circular inside surface surrounding the fluid injection portion orifice.

* * * * *